US005636330A

United States Patent [19]
Barak

[11] Patent Number: 5,636,330
[45] Date of Patent: Jun. 3, 1997

[54] METHOD AND APPARATUS FOR CREATING A CONTROL STRIP

[75] Inventor: Ilan Barak, Hadera, Israel

[73] Assignee: Scitex Corporation Ltd., Herzliya, Israel

[21] Appl. No.: 335,664

[22] Filed: Nov. 8, 1994

Related U.S. Application Data

[62] Division of Ser. No. 896,688, Jun. 10, 1992, abandoned.

[30] Foreign Application Priority Data

Jun. 11, 1991 [IL] Israel .......... 98453

[51] Int. Cl.$^6$ .......... G06K 15/00

[52] U.S. Cl. .......... 395/109; 395/101; 358/501; 358/504

[58] Field of Search .......... 395/100, 109, 395/101, 106, 131, 114; 358/504, 505, 75, 298, 515–520, 501; 101/211, 150; 356/416

[56] References Cited

U.S. PATENT DOCUMENTS

| | | | |
|---|---|---|---|
| 4,299,165 | 11/1981 | Nichols et al. | 101/150 |
| 4,350,996 | 9/1982 | Rosenfeld | 358/75 |
| 4,448,533 | 5/1984 | Jeschke et al. | 356/416 |
| 4,456,924 | 6/1984 | Rosenfeld | 358/75 |
| 4,469,025 | 9/1984 | Loffler et al. | 101/211 |
| 4,852,485 | 8/1989 | Brunner | 101/211 |
| 4,881,181 | 11/1989 | Jeschke et al. | 364/519 |
| 4,947,746 | 8/1990 | Jeschke et al. | 101/211 |
| 5,206,707 | 4/1993 | Oh | 356/402 |
| 5,339,176 | 8/1994 | Smilansky et al. | 358/521 |

FOREIGN PATENT DOCUMENTS

| | | |
|---|---|---|
| 0075270 | 3/1983 | European Pat. Off. . |
| 0085750 | 8/1983 | European Pat. Off. . |
| 0255031 | 2/1988 | European Pat. Off. . |
| 0394681 | 10/1990 | European Pat. Off. . |
| 3316370 | 11/1983 | Germany . |
| 3325006 | 6/1984 | Germany . |
| 0097147 | 7/1994 | Israel . |
| 9104154 | 4/1991 | WIPO . |

OTHER PUBLICATIONS

Elyjiw, Zenon, "GATF Compact Color Test Strip", Research Project Report No. 6079, Graphic Arts Technical Foundation, Inc., Pittsburgh, PA; 1968.

GATF Quality Control Device Catalog, Graphic Arts Technical Foundation, Pittsburgh, Pittsburgh, PA; 1968.

"Digital Control Wedge", UGRA Mitteilungen, vol. 1, Apr. 1990 (translation attached).

Elyjiw, Zenon, "GATF Compact . . . Strip", Research Project Report No. 6079, Graphics Arts Tech. Found. Inc. Pitts.

GATF Quality Control . . . Catalog, Graphic Arts Tech. Found., Pittsburgh, PA: 1989.

Digital Control Wedge, UGRA Mitteilungen, vol. 1, Apr. 1990.

Zenon, Elyjiw; GATF Compact Color Test Strip; Research Report No. 6079; 1968, pp. 1–3, Graphics Arts Technical Foundation.

*Primary Examiner*—Mark R. Powell
*Assistant Examiner*—Tracy M. Legree
*Attorney, Agent, or Firm*—Ladas & Parry

[57] ABSTRACT

A control strip including an analog representation of a control color image useful in controlling the reproduction of a main color image, characterized in that the analog representation of the control color image was provided by the method of providing a digital representation of the control color image and transforming the digital representation of the control color image into the analog representation of the control color image.

24 Claims, 5 Drawing Sheets
(3 of 5 Drawing(s) in Color)

METHOD AND APPARATUS FOR CREATING A CONTROL STRIP

This is a divisional of application Ser. No. 07/896,688 filed on Jun. 10, 1992, now abandoned.

FIELD OF THE INVENTION

The present invention relates to electronic color pre-press and press systems and techniques generally.

BACKGROUND OF THE INVENTION

Control strips are particularly useful in monitoring the setting up of printing presses for new printing jobs by allowing careful comparison of the parameters of a printed product to the same parameters of a proof signed by a customer. Parameters which are compared include ink hues and densities, hues of secondary colors, dot gain/loss and halftone dot deformation as a result of slur or doubling. Control strips are also useful for maintaining printing parameters over a period of time to enable the printing of faithful copies of a proof of an original.

Conventional control strips for offset or gravure color printing include off-the-shelf control strips which cannot be modified by a user. A wide variety of such strips are sold, under tradenames such as Chromalin by Dupont or Matchprint by 3M, to cater to different printing needs. Often printing workshops are required to stock large numbers of control strips to cover ordinary printing jobs.

State of the art control strip patterns are described in the following documents:

Elyjiw, Zenon. "GATF Compact Color Test Strip", Research Project Report No. 6079, Graphics Arts Technical Foundation, Inc., Pittsburgh, Pa.: 1968.

*GATF Quality Control Device Catalog,* Graphic Arts Technical Foundation, Pittsburgh, Pa.: 1989.

The application of control strips in the conventional printing and proof process is now briefly explained. A control strip is manually mounted with a color separation film on a plate. The plate is exposed and then developed. This stage is performed for each color separation needed to print copies of the original. A color proof is produced in a similar fashion.

The plates are placed in a predetermined color sequence on a printing press, and the printing run is initiated. If the printing quality of output sheets is not satisfactory, as evidenced by comparison to the proof, then operation parameters of the printing press are changed accordingly to compensate for any deviations from the desired quality.

This technology presents various problems which have been discussed in the literature, such as the problem of mutual registration of color separations discussed in U.S. Pat. Nos. 4,469,025 to Loffler et al, automatic evaluation of the control strip discussed in 4,448,533, and in-process control to deal with the problem of variation between copies discussed in 4,852,485.

State of the art technology has eliminated the film stage by enabling direct exposure of plates from digital information stored in a color electronic pre-press system. This technology is known as computer-to-plate (CTP) technology. A commercially available device for performing CTP is the Raystar Imagesetter, commercially available from Scitex Corporation, Herzlia, Israel.

Similarly, a proofing process known as direct digital color proofing (DDCP) enabling direct exposure of proofs from digital information stored in 8 color electronic pre-press system has been developed and is known in the art. The Approval proofer, commercially available from Kodak, is an example of a DDCP device.

Postscript is a format defined by Adobe Systems Inc., California, U.S.A., for defining page parameters such as types of letters and graphics parameters of images for output by a printer or film imagesetter. Initially, Postscript was used for black and white page printing. Electronically mountable control strips for black and white Postscript defined pages are known and are discussed in "Digital Control Wedge", UGRA Mitteilungen, Vol. 1, April 1990. The output of this type of process is a printed page or film provided by an imagesetter or printer.

SUMMARY OF THE INVENTION

The present invention seeks to provide a control strip generated from a digital precursor as well as apparatus and methods for user generation of a control strip by creating a digital precursor of a control strip. The user generated control strips are preferably capable of being printed by a CTP device and a DDCP device.

There is thus provided in accordance with a preferred embodiment of the present invention a control strip including an analog representation of a control color image useful in controlling the reproduction of a main color image, characterized in that the analog representation of the control color image was provided by the method of providing a digital representation of the control color image, and transforming the digital representation of the control color image into the analog representation of the control color image.

Further in accordance with a preferred embodiment of the present invention, the step of transforming includes the steps of selecting at least one printing parameter, and printing the digital representation of the control color image in accordance with the at least one selected printing parameter.

There is also provided in accordance with a further preferred embodiment of the present invention a method for providing a control strip, the control strip including an analog representation of a control color image useful in controlling the reproduction of a main color image, the method including the step of providing a digital representation of the control color image.

Further in accordance with a preferred embodiment of the present invention, the step of transforming includes the steps of selecting at least one printing parameter, and printing the digital representation of the control color image in accordance with the at least one selected printing parameter.

Still further in accordance with a preferred embodiment of the present invention, the at least one printing parameter includes at least one of the following group: screen angle, dot shape, screen ruling, dot gain, and gray balance.

Additionally in accordance with a preferred embodiment of the present invention, the control color image includes at least one of the following group: solids of single colors, solids of two color overprints, solids of three color overprints, solids of four color overprints, colored tinted elements, colored microlines, colored slur targets, gray balance patches, registration targets, gray scale, highlights, and shadows.

Further in accordance with a preferred embodiment of the present invention, the method also includes the step of transforming the digital representation of the control color image into an analog representation of the control color image.

Still further in accordance with a preferred embodiment of the present invention, the step of transforming includes the steps of providing a digital representation of the main color image, and employing a color printing device to transform the digital representations of the main color image and of the control color image into an analog representation of a composite image, the composite image including the main color image and the control color image.

Additionally in accordance with a preferred embodiment of the present invention, the step of transforming includes the step of determining the orientation of the control color image within the composite image.

Further in accordance with a preferred embodiment of the present invention, the step of transforming includes the step of determining the location of the control color image within the composite image.

Still further in accordance with a preferred embodiment of the present invention, the color printing device includes a printing press and/or a proofer.

There is also provided in accordance with yet a further preferred embodiment of the present invention apparatus for providing a control strip, the control strip including an analog representation of a control color image useful in controlling the reproduction of a main color image, the apparatus including apparatus for providing a digital representation of the control color image, and apparatus for transforming the digital representation of the control color image into an analog representation of the control color image.

There is further provided in accordance with yet a further preferred embodiment of the present invention an integrated pre-press and press system including apparatus for providing a digital representation of at least one main image and of at least one control strip corresponding to the at least one main image, proofing apparatus for receiving the digital representation and providing a proof including an analog representation of the at least one control strip, a press for receiving the digital representation and providing a printed output including an analog representation of the at least one main image and of the at least one control strip, and apparatus for controlling the operation of the press in accordance with the results of a comparison of the appearance of the printed output to the appearance of the proof.

Further in accordance with a preferred embodiment of the present invention, the step of transforming includes the step of printing the control color image either as a positive or a negative.

There is also provided in accordance with yet a further preferred embodiment of the present invention, digital storage apparatus including a digital representation of a control color image useful in controlling the reproduction of a main color image.

Further in accordance with a preferred embodiment of the present invention, the digital storage apparatus also includes a digital representation of the main color image.

BRIEF DESCRIPTION OF DRAWINGS

The file of this patent contains at least one drawing executed in color. Copies of this patent with color drawing (s) will be provided by the Patent and Trademark Office upon request and payment of the necessary fee.

The present invention will be understood and appreciated more fully from the following detailed description, taken in conjunction with the drawings in which.

DETAILED DESCRIPTION OF A PREFERRED EMBODIMENT

Figure 1:
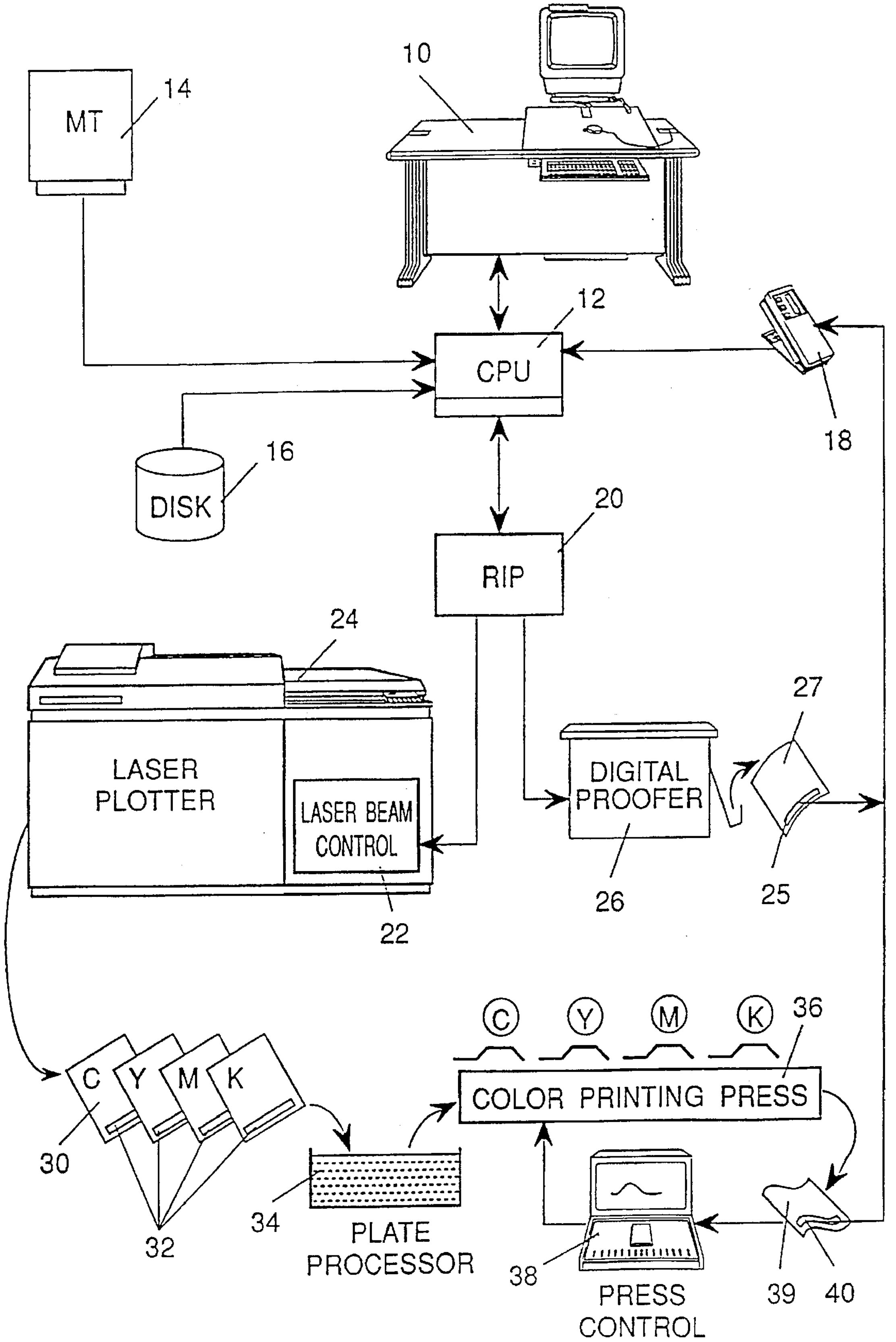
FIG. 1 is a generalized block diagram of an integrated pre-press and printing system useful for generating a control strip.

Reference is now made to FIG. 1 which illustrates an integrated pre-press and printing system constructed and operative in accordance with the present invention. The system employs control strips which are compared to proof control strips in order to calibrate a press for a new original, and in order to control the printing of output sheets during a print run.

The system comprises an operator interface workstation 10, such as a Prisma Workstation, commercially available from Scitex Corporation Ltd., Herzlia, Israel. The workstation 10 interfaces with a CPU 12, such as a Whisper, also commercially available from Scitex. The CPU 12 is arranged to interface with data storage apparatus such as a magnetic tape drive 14 and a disk drive 16 for receiving a digital file representing scanned or otherwise generated text and graphics information, which information will also be referred to here as "the main color image".

In accordance with a preferred embodiment of the present invention a user creates a digital file on the workstation 10 which comprises a digital representation of a control strip. Alternatively, the user may retrieve a digital representation of a control strip from suitable electronic storage means such as disk 16. According to a preferred embodiment of the invention, the digital file comprises a LW (linework) representation and/or a CT (continuous tone) representation.

It is appreciated that a digital representation of a control strip constructed in accordance with the method described herein may be a precursor of any of the following: a control strip 25 on a proof 27, control strips 32 on a plurality of color separation plates 30 and a control strip 40 on a printed output sheet 39.

The CPU 12 outputs the digital files representing the main color image or images and the control strip to a screen generator 20, such as the screen generator described in U.S. Pat. Nos. 4,350,996 and 4,456,924 to Rosenfeld, both assigned to the Applicant. The screen generator 20 preferably provides a full plate digital representation of the main image/s and of the control strips.

The digital plate is characterized by screening parameters such as screen ruling, screen angle and dot shape. The screen ruling may be expressed in lines per inch and the screen angle in degrees. The dot shape may be of any suitable configuration, such as square, round, diamond or a computer optimized configuration. Alternatively, or in addition, commercially available systems exist for allowing a user to define a desired dot shape. These systems include the Scitex User Dot (U-Dot) function operative in conjunction with the Scitex Prisma workstation or the Scitex Response 300 workstation, all commercially available from Scitex Corporation, Herzlia, Israel; and the Spot function used in conjunction with Adobe's Postscript format.

The screen generator 20 interfaces with a digital proofer 26 which Outputs proof 27 including the control strip 25. Commercially available digital proofers include the Approval Digital Color Proofing System, by Eastman Kodak Co., Rochester, N.Y., U.S.A.; Digital Matchprint, by 3M; and the Iris, by Scitex Corporation. The screen generator 20 also interfaces with a laser beam controller 22 incorporated in a laser plotter 24, such as a Scitex Raystar plotter, commercially available from Scitex Corporation Ltd., Herzlia, Israel.

The laser plotter 24 provides the color separation film and/or plates 30 including the control strips 32. Subsequently, the color separation plates 30 are typically processed in a plate processor 34, such as an Econo 65/85, commercially available from Ajax International Bailerup, Denmark. The processed plates 30 are mounted in a predetermined color sequence on a color printing press 36, such as a GTO series press, commercially available from Druckmaschinien AG, Heidelberg, Germany, for printing output sheets 39 including control strips 40.

The operation of the printing press 36 is preferably automatically monitored by a press control device 38, such as a CPC, commercially available from Druckmaschinien AG, Heidelberg, West Germany and described in U.S. Pat. No. 4,852,485 to Brunner, the disclosure of which is incorporated herein by reference. The press control device 38 utilizes the strip 40 to control variables such as the ink density and plate pressure of the printing press 36.

A detailed description of an integrated pre-press and press system is provided in Applicant's Israel Patent Application No. 97147, the disclosure of which is incorporated herein by reference.

The calibration of the printing press 36 for a new original is now described. First, the proof 27, including control strip 25, and the color separation plates 30 are produced as described hereinabove. The press 36 is set up and output sheet 39, including control strip 40, is produced. Subsequently, at least one element of control strip 40 is compared to the corresponding at least one element of control strip 25.

The comparison may be performed visually, by a human operator, or, alternatively, automatically, using suitable apparatus such as a densitometer 18, which may comprise a Model 428 densitometer, commercially available from Xrite, Grandville, Mich., U.S.A. The densitometer 18 can detect changes in the size and color density of a printed half tone dot compared to a proofed dot.

Figure 2A:
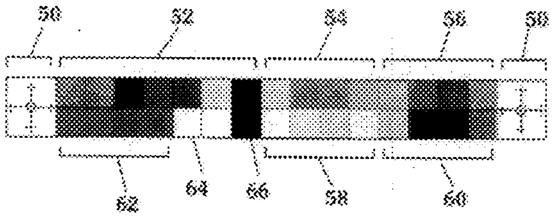
FIGS. 2A, 2B and 2C are color illustrations of control strips constructed and operative in accordance with preferred embodiments of the invention.
Figure 2B:
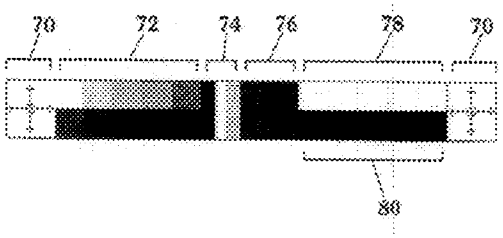
Figure 2C:
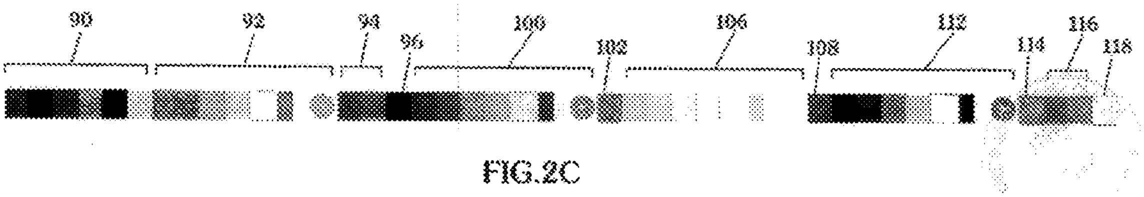

Reference is now made to FIGS. 2A–2C which illustrate color control strips constructed and operative in accordance with preferred embodiments of the invention. The control strips of FIGS. 2A–2C conform to international SWOP regulations. It is appreciated that the method and apparatus for generating control strips disclosed herein is not limited to generation of the specific control strips illustrated in FIGS. 2A–2C or even to combinations of the features thereof. FIGS. 2A–2C are intended only to be examples of possible control strip configurations.

FIG. 2A illustrates a preferred embodiment of a control strip particularly suitable for monitoring color and registration qualities of a proof produced by a digital proofer.

The control strip of FIG. 2A preferably includes the following elements: a registration target 50 comprising a plurality of relatively thin lines or curves for monitoring quality of registration; an array 52 of single color solids, two color overprints, three color overprints and four color overprints; cyan, magenta, yellow and black arrays 54, 56, 58 and 60, respectively, each comprising a plurality of patches differing in dot percentage, a gray balance array 62 and a white patch 64.

FIG. 2B illustrates a preferred embodiment of a control strip particularly suitable for controlling plate exposure quality. The control strip of FIG. 2B preferably includes the following elements: a registration target 70; a gray scale array 72 comprising a sequence of steps having a fixed dot percentage interval between them such as 10%, for monitoring exposure linearity; a microline array 74 comprising a plurality of positive and negative microline patches, the microlines having varying widths within a suitable range such as 6–50 microns; an array 76 of diagonal, horizontal and vertical lines; a highlight array 78 comprising patches having relatively high dot percentages which typically vary from approximately 1% to 5%; and a shadow array 80 comprising patches having relatively low dot percentages which typically vary from approximately 95% to 99%.

FIG. 2C illustrates a printing control strip, also termed a production control strip, suitable for printing on each output sheet 39 of FIG. 1 due to its particularly narrow configuration. The printing control strip of FIG. 2C preferably includes an array 90 of single color solids, two color overprints and three color overprints; a cyan array 92 comprising cyan patches of different dot percentages, including highlights and shadows, cyan microlines and a cyan slur target, a gray balance array 94; a solid black patch 96; a magenta array 100 comprising magenta patches of different dot percentages, including highlights and shadows, magenta microlines and a magenta slur target; a solid cyan patch 102; a yellow array 106 comprising yellow patches of different dot percentages, including highlights and shadows, yellow microlines and a yellow slur target; a solid magenta patch 108; a black array 112 comprising black patches of different dot percentages, black microlines and a black slur target; a solid cyan patch 114; a gray balance array 116; and a solid white patch 118.

It is a particular feature of the present invention that the user can design his own control strips. A user may delete any of the components, arrays and patches described above; may add suitable components, arrays or patches; may rearrange components within the control strip; may change the dimensions or orientation on the page of the control strip; or may change the parameters of any component, array or patch, such as but not limited to the dot shape thereof.

Figure 3A:
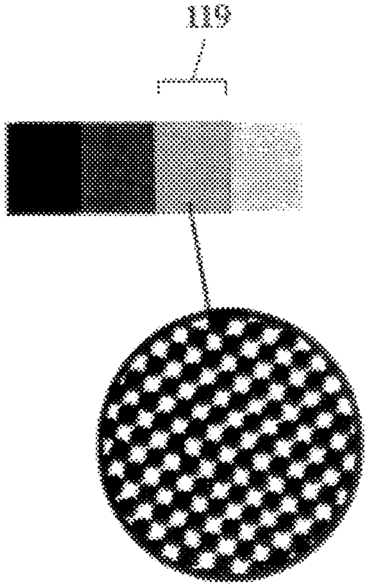
FIGS. 3A and 3B are color illustrations of portions control strips having different screening parameters.
Figure 3B:
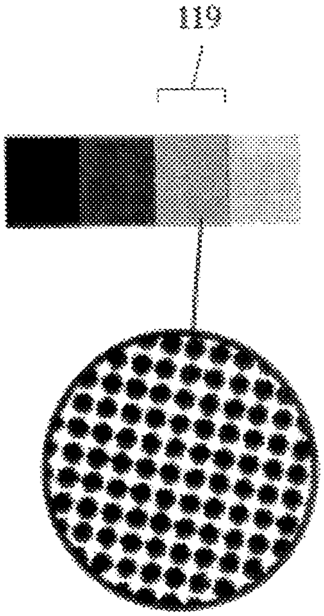

Reference is now made to FIGS. 3A and 3B which illustrate screening parameters of a 50% black patch 119 such as the 50% black patch of black array 112 in FIG. 2C. In FIG. 3A, the patch 119 is formed of square dots oriented at a 30° screen angle and having a screen ruling of 175 lines per inch. In FIG. 3B, the patch 119 is formed of round dots oriented at a −7.5° screen angle and having a screen ruling of 133 lines per inch. It is appreciated that the apparatus and method of the present invention, which provide a digital precursor of a control strip from which a control strip may be printed, allow a user to select any suitable value For any of the above screening parameters by inputting suitable options to screen generator 20 of FIG. 1. The result is a control strip with the user-selected screen parameters.

It is a further feature of the present invention that a user may customize individual patches according to the particular printing application. Such customized patches may include a particularly configured registration target. Another type of customized patch is a custom color patch representing a particular color other than cyan, magenta, Fellow and black, such as gold, silver, or Panton colors. The customized color patch is intended to monitor printing of a color employed in a particular printing application, generally in addition to the process colors. The custom colors are generally generated as additional plates and are overprinted in designated areas of the color image on the plate. The customized color may or may not be a combination of C, M, Y and K.

Figure 4A:
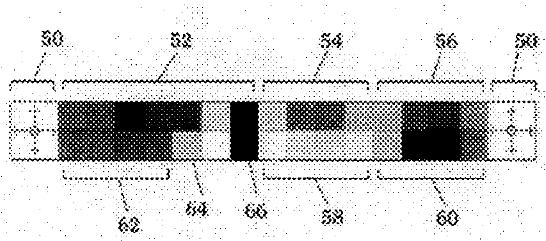
FIG. 4A and 4B are color illustrations of control strips having custom patches.
Figure 4B:
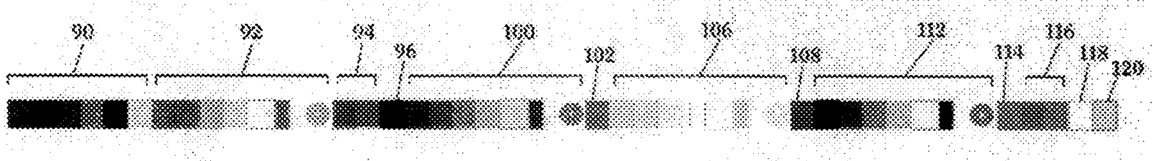

FIGS. 4A and 4B illustrate control strips including customized patches. The control strip of FIG. 4A is generally identical to the control strip of FIG. 2A except that, in FIG. 4A, white patch 64 of FIG. 2A is replaced by a customized color patch 120 representing a beige color important For a particular application. The control strip FIG. 4B, is generally identical to the control strip of FIG. 2C except that customized beige color patch 120 is added.

Figure 5:
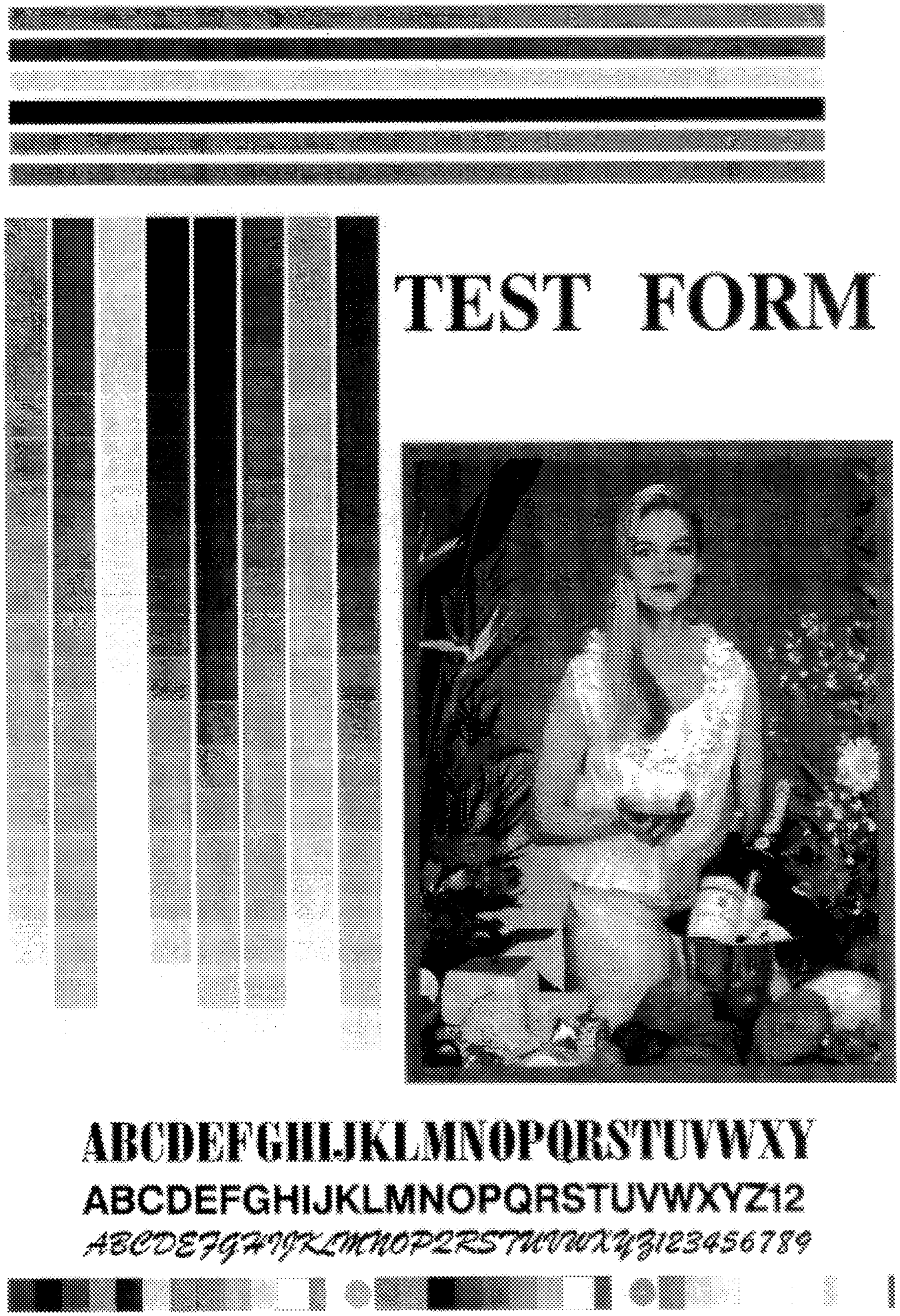
FIG. 5 is a color illustration of a full page test form.

It is appreciated that the term "control strip" as employed in the present specification and claims is not intended to be limited to conventional strip-like configurations but rather is intended to refer to a representation of a control color image employed mainly for controlling the reproduction of a main color image, the control color image having any suitable configuration. The term "control strip" is also not intended to exclude a representation of a control color image employed mainly for setting up a color printing device such as a press. For example, FIG. 5 illustrates a full page color control strip or test form useful for monitoring the operation of a color writing device such as a press during press set up.

A particular advantage of a digitally represented control strip is that the control strip may be printed as either a positive or a negative.

It is appreciated that the method shown and described herein is particularly suited to providing control strips for use in direct digital proofing.

It will be appreciated by persons skilled in the art that the present invention is not limited by what has been particularly shown and described hereinabove. Rather the scope of the present invention is defined only by the claims which follow:

I claim:

1. A method for providing a control strip, said control strip comprising an analog representation of a control color image useful in controlling the reproduction of a main color image, the method comprising the steps of:

providing a digital representation of said control color image; and transforming said digital representation of said control color image into an analog representation of said control color image, said step of transforming comprises the steps of:

providing a digital representation of the main color image; and employing a color printing device to transform the digital representations of the main color image and of the control color image into an analog representation of a composite image, the composite image comprising the main color image and the control color image.

wherein said step of transforming further comprises the step of determining the orientation of the control color image within the composite image.

2. A method according to claim 1 wherein said color printing device comprises a printing press.

3. A method according to claim 1 wherein said color printing device comprises a proofer.

4. The control strip produced by the method of claim 1.

5. A method according to claim 1 and wherein said step of transforming further comprises the steps of:

selecting at least one printing parameter; and employing said color printing device in accordance with said at least one selected printing parameter.

6. A method according to claim 4 and wherein said at least one printing parameter is selected from the group consisting of:

screen angle;

dot shape;

screen ruling;

dot gain; and gray balance.

7. A method according to claim 1 and wherein said control color image is selected from the group consisting of:

solids of single colors;

solids of two color overprints;

solids of three color overprints;

solids of four color overprints;

colored tinted elements;

colored slur targets; and gray balance patches.

8. A method for providing a control strip, said control strip comprising an analog representation of a control color image useful in controlling the reproduction of a main color image, the method comprising the steps of:

providing a digital representation of said control color image; and transforming said digital representation of said control color image into an analog representation of said control color image, said step of transforming comprises the steps of:

providing a digital representation of the main color image; and employing a color printing device to transform the digital representations of the main color image and of the control color image into an analog representation of a composite image, the composite image comprising the main color image and the control color image, wherein said step of transforming further comprises the step of determining the location of the control color image within the composite image.

9. A method according to claim 8 wherein said color printing device comprises a printing press.

10. A method according to claim 8 wherein said color printing device comprises a proofer.

11. A method according to claim 8 and wherein said step of transforming further comprises the steps of:

selecting at least one printing parameter; and employing said color printing device in accordance with said at least one selected printing parameter.

12. A method according to claim 11 and wherein said at least one printing parameter is selected from the group consisting of:

screen angle;

dot shape;

screen ruling;

dot gain; and gray balance.

13. A method according to claim 8 and wherein said control color image is selected from the group consisting of:

solids of single colors;

solids of two color overprints;

solids of three color overprints;

solids of four color overprints;

colored tinted elements;

colored microlines;

colored slur targets; and gray balance patches.

14. The control strip produced by the method of claim 8.

15. A method for providing a control strip, said control strip comprising an analog representation of a control color image useful in controlling the reproduction of a main color image, the method comprising the steps of:

providing a digital representation of said control color image; and transforming said digital representation of said control color image into an analog representation of said control color image, wherein said step of transforming further comprises the step of printing the control color image as a positive.

16. A method according to claim 15 and wherein said step of transforming further comprises the steps of:

selecting at least one printing parameter; and printing the control color image in accordance with the at least one selected printing parameter.

17. A method according to claim 16 and wherein said at least one printing parameter is selected from the group consisting of:

screen angle;

dot shape;

screen ruling;

dot gain; and gray balance.

18. A method according to claim 15 and wherein said control color image is selected from the group consisting of:

solids of single colors;

solids of two color overprints;

solids of three color overprints;

solids of four color overprints;

colored tinted elements;

colored microlines;

colored slur targets; and gray balance patches.

19. The control strip produced by the method of claim 15.

20. A method for providing a control strip, said control strip comprising an analog representation of a control color image useful in controlling the reproduction of a main color image, the method comprising the steps of:

providing a digital representation of said control color image; and transforming said digital representation of said control color image into an analog representation of said control color image, wherein said step of transforming further comprises the step of printing the control color image as a negative.

21. A method according to claim 20 and wherein said step of transforming comprises the steps of:

selecting at least one printing parameter; and printing the control color image in accordance with the at least one selected printing parameter.

22. A method according to claim 21 and wherein said at least one printing parameter is selected from the group consisting of:

screen angle;

dot shape;

screen ruling;

dot gain; and gray balance.

23. A method according to claim 20 and wherein said control color image is selected from the group consisting of:

solids of single colors;

solids of two color overprints;

solids of three color overprints;

solids of four color overprints;

colored tinted elements;

colored microlines;

colored slur targets; and gray balance patches.

24. The control strip produced by the method of claim 20.

* * * * *